US006669214B1

(12) United States Patent
Domis

(10) Patent No.: US 6,669,214 B1
(45) Date of Patent: Dec. 30, 2003

(54) MECHANIC'S TOOL AND PARTS UTILITY CART

(76) Inventor: David Domis, 1237 Sunset Rd., W.P.B., FL (US) 33406

(*) Notice: Subject to any disclaimer, the term of this patent is extended or adjusted under 35 U.S.C. 154(b) by 29 days.

(21) Appl. No.: 10/145,614

(22) Filed: May 13, 2002

(51) Int. Cl.[7] .................................................. B62B 11/00

(52) U.S. Cl. ................................ 280/47.35; 280/47.19; 280/79.3; 280/79.11

(58) Field of Search ........................... 280/47.34, 47.35, 280/47.18, 47.19, 47.23, 47.24, 47.26, 47.29, 47.31, 47.41, 651, 79.11, 79.2, 79.3, 79.4, 79.5, 79.6, 79.7, 43.12, 30; 211/85.18, 193, 70.6, 126.1, 126.2, 133.1, 187; 248/129; 312/249.11, 287, 201; 108/14, 26

(56) References Cited

U.S. PATENT DOCUMENTS

| | | | | | |
|---|---|---|---|---|---|
| 681,098 | A | * | 8/1901 | Brown | 211/133.1 |
| 1,171,343 | A | * | 2/1916 | Klok | 280/79.3 |
| 1,445,395 | A | * | 2/1923 | Harvey | 108/26 |
| 1,854,777 | A | * | 4/1932 | Bales | 211/126.15 |
| 1,961,394 | A | * | 6/1934 | Rothe | 211/130.1 |
| 2,819,938 | A | * | 1/1958 | Zerver | 312/201 |
| 2,886,186 | A | * | 5/1959 | Hamilton | 108/189 |
| 3,721,349 | A | * | 3/1973 | Jaffee et al. | 211/126.1 |
| 4,119,044 | A | | 10/1978 | Hines | |
| 4,715,573 | A | | 12/1987 | Liegel | |
| 4,763,799 | A | * | 8/1988 | Cohn et al. | 211/187 |
| 4,795,180 | A | | 1/1989 | Polcyn | |
| 4,923,202 | A | * | 5/1990 | Breveglieri et al. | 280/47.35 |
| 5,069,464 | A | * | 12/1991 | Braconnier | 280/47.35 |
| 5,269,545 | A | | 12/1993 | Huebschen | |
| 5,438,938 | A | * | 8/1995 | Meeker et al. | 108/91 |
| 5,460,391 | A | | 10/1995 | Gantz | |
| 5,518,127 | A | * | 5/1996 | Warmack et al. | 211/193 |
| 5,566,961 | A | * | 10/1996 | Snell et al. | 280/47.35 |
| 5,588,659 | A | | 12/1996 | Boes et al. | |
| 5,839,739 | A | * | 11/1998 | Shannon et al. | 280/47.35 |
| 5,927,745 | A | * | 7/1999 | Cunningham | 280/652 |
| 5,927,837 | A | | 7/1999 | Schmidt | |
| 5,997,116 | A | | 12/1999 | Schmidt | |
| 6,102,497 | A | * | 8/2000 | Ehr et al. | 280/47.35 |
| 6,497,423 | B1 | * | 12/2002 | Perelli et al. | 280/47.34 |
| 6,572,123 | B2 | * | 6/2003 | Calmeise et al. | 280/47.35 |

* cited by examiner

*Primary Examiner*—Brian L. Johnson
*Assistant Examiner*—Hau Phan
(74) *Attorney, Agent, or Firm*—C. J. Husar, Esq.

(57) ABSTRACT

A tool and parts cart is provided with a caster frame and three levels of storage area for both the tools required for a repair job and also the parts that are removed from a vehicle while the mechanic is undertaking the repairs. The lowermost level is a single large storage area that can accommodate larger parts, vehicle components and/or tools. Lowermost tray is provided with four walls to contain any items placed therein. Intermediate level is provided with three compartment, two side and forward, with the forward compartment recessed relative to the other two compartments, thus forming a U-shaped second level with an open central portion for accommodating large parts when placed in a vertical position. Uppermost level is provided with an open well that is formed by frame members to accommodate a removable tray. Removable tray is provided with handles for moving about and also a plurality of casters on the bottom thereof for moving the tray about when used on the floor during under the vehicle work. It is also of sufficient size to be readily taken inside a vehicle and placed on the seat when the mechanic is doing under-the-dash work, i.e. installing an air bag or other interior work.

10 Claims, 2 Drawing Sheets

FIG.3
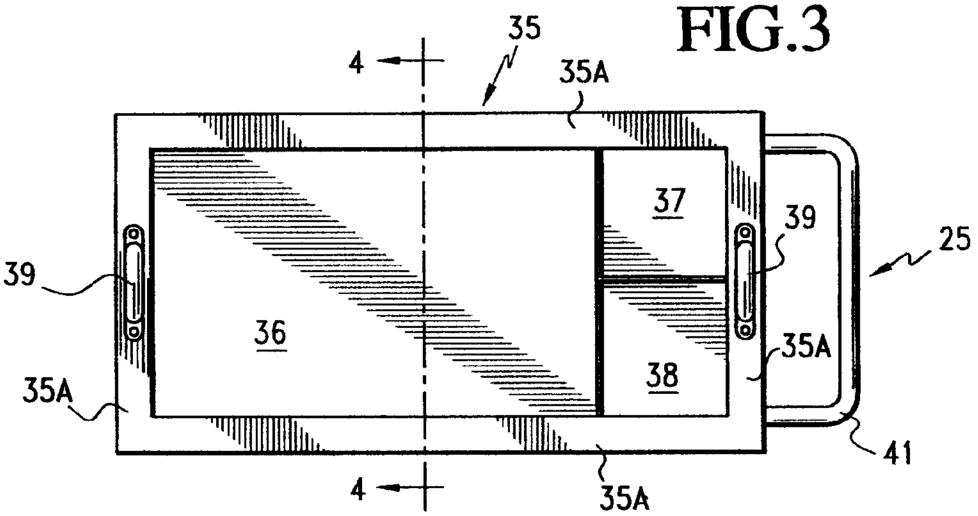
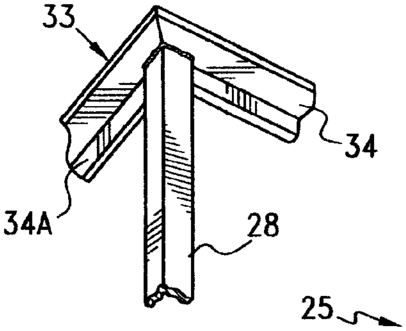
FIG.5
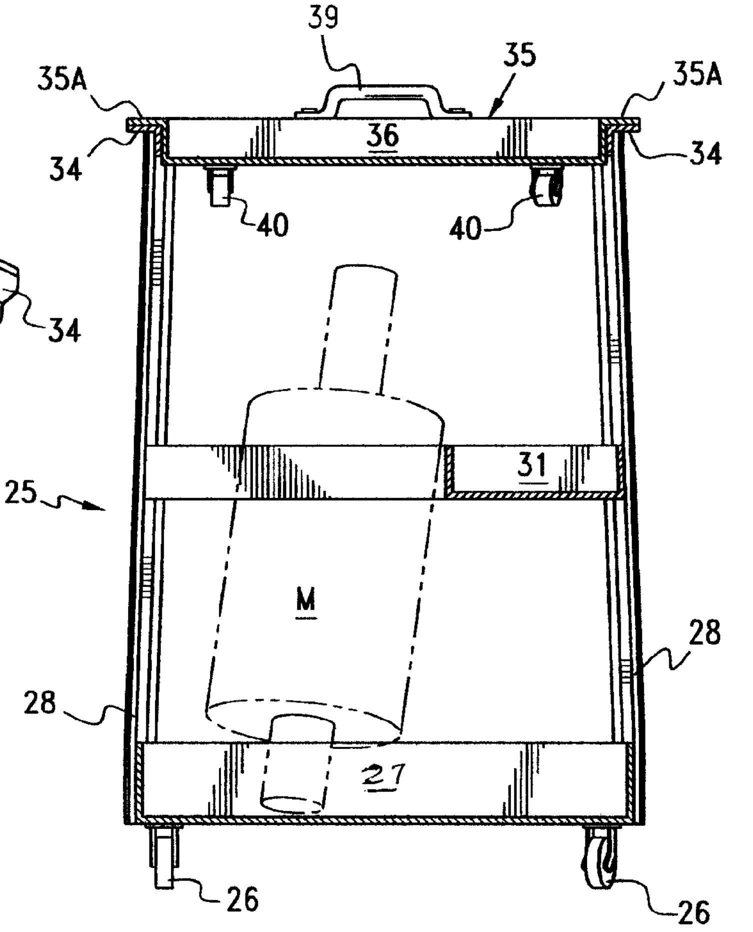
FIG.4

MECHANIC'S TOOL AND PARTS UTILITY CART

BACKGROUND OF THE INVENTION

The present invention relates to a mechanic's utility cart and more specifically relates to a mechanic's tool and parts cart. There are many tool chests presently available for use by mechanics. However, they are all used primarily for storing a mechanic's tools and have no room for parts when a mechanic is working on a vehicle and in many instances are of such weight that they cannot be readily moved about. There are no known utility carts presently available that can be used by a mechanic when he is working on a particular job, i.e. there is no place for him to place the parts that are removed from a vehicle to complete the job. In most instances, there are a series of parts that must be removed in a particular order to allow a mechanic to get the point where the repair is needed. For example, if a mechanic is replacing the brake shoes on an auto, the tires must first be removed, requiring a place to keep the wheel cover, which may or may not require a special tool for removing it to gain access to the lug nuts, the axle dust cap, castellated nuts and cotter pins, must all be removed to allow the drums to be removed and once the drums are removed, there are springs that must be removed to gain access to the shoes. All these parts must be kept in a safe place to insure that they are readily available when the mechanic is ready to re-assemble the parts after installing the new brake shoes. The reverse order of steps is taken in re-assembling the parts. The usual approach taken, is for the mechanic to place these various parts on the floor or on a nearby workbench until he is ready to re-assemble them. Quite often, these parts become lost or misplaced due to someone accidentally kicking into them on the floor or someone moving them from their original location because they needed room at the workbench. The subject invention is designed to provide a mechanic with a readily movable cart that can be rolled into the immediate vicinity of where he is working and provide him with space where the removed parts can be stored until he is ready to reassemble them. By means of this invention, lost parts are kept to a minimum, time is saved, because the parts are available when needed and the re-assembling proceeds in an orderly and timely manner.

SUMMARY OF THE INVENTION

A combination tool and parts utility cart is provided with casters for easy movement and a plurality of shelves that are divided into compartments for keeping parts and tools separated. The top level of the cart includes a well that receives a removable tray with lifting handles at opposite ends and four smaller caster at the respective underside corners to allow the mechanic to take the tray with him under a vehicle raised off the floor and deposit parts therein without getting up and going to a bench to place them down. The tray can also be placed on top of the engine when the hood is raised and allow the mechanic to place new and removed plugs therein, without returning to the bench to place the removed plugs down and pick up the new ones, or taken into the interior of the vehicle and set the tray on the seat while doing some under-the-dash repairs, thus saving additional steps and also time. The uppermost portion of the cart, with the tray in place or removed, is of sufficient dimensions to allow the placement of heavier components such as tailgate, door or bumper thereon without collapsing the cart. The middle portion of the cart is made in a U-shape with the center portion partially removed to provide space for the vertical positioning of parts such as a drive axle, bumper, muffler or other lengthy components. In addition to the cut-out portion, the remainder of the second level includes three open compartments, two larger ones of equal size and a third smaller one therebetween for tools or smaller parts. The lowermost or base level of the cart is provided with a plurality of compartments, which are deeper than the compartments of the second level and can accommodate larger parts and tools. The overall unit is made of sufficient structural strength to allow major components of a vehicle to be placed thereon without collapsing the cart. Thus it can be seen that applicant has provided a job specific tool and parts cart that provides the mechanic with a convenient place for storing tools and parts when working on a particular job.

DISCUSSION OF THE PRIOR ART

A prior art search was made of the Patent Office files in the appropriate Classes and subclasses and revealed the following U.S. patents:

U.S. Pat. No. 4,119,044—issued to R. E. Hines on Oct. 10, 1978 and discloses a tool caddy with a lower tray that is supported by casters and an upper tray that has a carrying handle and is removable from its stand. The upper tray has a plurality of hooks for hanging tools.

U.S. Pat. No. 4,7115,573—issued to R. D. Liegel on Dec. 29, 1987 and discloses a tool tray having a lower base or frame that is supported by casters and a vertically extending support for an upper tray. Both the lower base and upper tray have casters thereon.

U.S. Pat. No. 4,795,180—issued to J. Poleyn on Jan. 3, 1989 and discloses a compartmented wheeled tray for use by a mechanic for holding his tools when working beneath a vehicle.

U.S. Pat. No. 5,269,545—issued to Huebschen et al on Dec. 14, 1995 and discloses a molded plastic utility cart with an I-shaped frame and a base with supporting casters. A tray is removably mounted in the upper portion of the unit. This cart serves mainly as tool cart providing ready access to the tools contained thereon.

U.S. Pat. No. 5,460,391—issued to Gantz et al on Oct. 24, 1995 and discloses combination tray and wheeled cart having a lower shelf and an upper tray fixedly mounted to the vertical supports. The unit is convertible from a self-standing unit to a re-configured arrangement whereby the legs can be re-oriented to become handles for carrying the tray. There are a plurality of possible uses for the tray/cart disclosed.

U.S. Pat. No. 5,588,659—issued to Boes et al on Dec. 31, 1996 and discloses a tool cart with a stand with four legs and a pair of rear wheels. The stand supports a plurality of spaced drawers and a vertically extending frame that supports a plurality of horizontally pivotable arms for holding sockets, screw drivers, pliers, wrenches, etc. A horizontal work surface is provided as well as a protective fiberglass cover when not in use.

U.S. Pat. Nos. 5,927,837 and 5,997,116—issued to L. D. Schmidt on Jul. 17, 1999 and Dec. 7, 1999, respectively and disclose a rolling tool box with an upper horizontal surface and a cut-out portion that receives a removable drawer with compartments and includes casters. The sides of the main frame include a pair of diagonal bins that taper outwardly from their bottom connecting point. On the side opoasite to these bins ithere s provided with a removable drawer that includes a handle for carrying.

As can be seen from a review of the above cited prior art, all of the above cited patents disclose trays and carts for storing the tools used by the mechanic or workman, there is currently nothing available that provides a storage area for the parts or components of the vehicle that is being worked on and also the tools requited for that particular job. Applicant has designed a combination tool and parts cart that provides the mechanic with a secure area where he can safely place the parts while the repair is undertaken and have them immediately available when it comes time to re-assemble the component that is being repaired. It can readily be observed that such a tool and parts cart can save the mechanic an enormous amount time in dis-assembling and re-assembling the particular job at hand. It eliminates the many trips the mechanic would have to make back and forth to and from a work bench or other safe place where the parts can be temporarily placed. The cart finds further utility in the situation where the mechanic has dis-assembled a particular job and has ordered the new parts required to finish the job, he can then move on to the next job with his cart, tools and parts and begin working on the next job until the parts from the first job have arrived and then return to the first job to complete it when the parts have arrived. The overall size of the cart is sufficiently large to hold the tools required for more than a single job as well as the parts that may be dis-assembled in the process of making the repairs, further the cart can be used as a portable work surface for making the repairs after the component has been removed from the vehicle, i.e. he can place a door, compressor or other sizable component on the upper surface of the cart and perform the repairs there without returning to a workbench to perform this task.

OBJECTS OF THE INVENTION

An object of the invention is to provide a tool and parts cart that can be used to provide a safe place for the mechanic to store them while repairs are undertaken on a vehicle.

Another object of the invention is to provide a tool and parts cart that includes a plurality of levels and compartments for storing the tools and parts.

A further object of the invention is to provide a tool and parts cart that includes an upper removable compartmented tray that can be removed from its stand and carried into the interior of a vehicle if so required, or placed on top of the engine when working under the hood.

A still further object of the invention is to provide a job specific tool and parts cart that is provided with a central cut-out portion that allows for the temporary placement and storage of large vehicle components such as a muffler, drive shaft or other elongated components.

Yet another object of the invention is to provide a tool and parts cart that significantly reduces the amount of time a mechanic spends moving back and forth from a workbench or otherwise looking for lost or misplaced parts.

These and other objects of the invention will become more apparent hereinafter. The instant invention will now be described with particular reference to the accompanying drawings that form a part of the specification wherein like reference characters designate the corresponding parts in the several views.

BRIEF DESCRIPTION OF THE DRAWINGS

FIG. 3 is a plan view of the tool and parts cart illustrating the layout of the compartmented tray.

FIG. 4 is a sectional view, taken along the plane 4—4 of FIG. 3, showing a side elevation view of the tool and parts cart with a muffler shown in phantom, illustrating the storage capabilities of the unit.

FIG. 5 is an enlarged view of the area encircled by the circle A in FIG. 2, illustrating the construction of the upper cart frame supporting well and its supporting leg.

DETAILED DESCRIPTION OF THE DRAWINGS

Figures 1, 2:
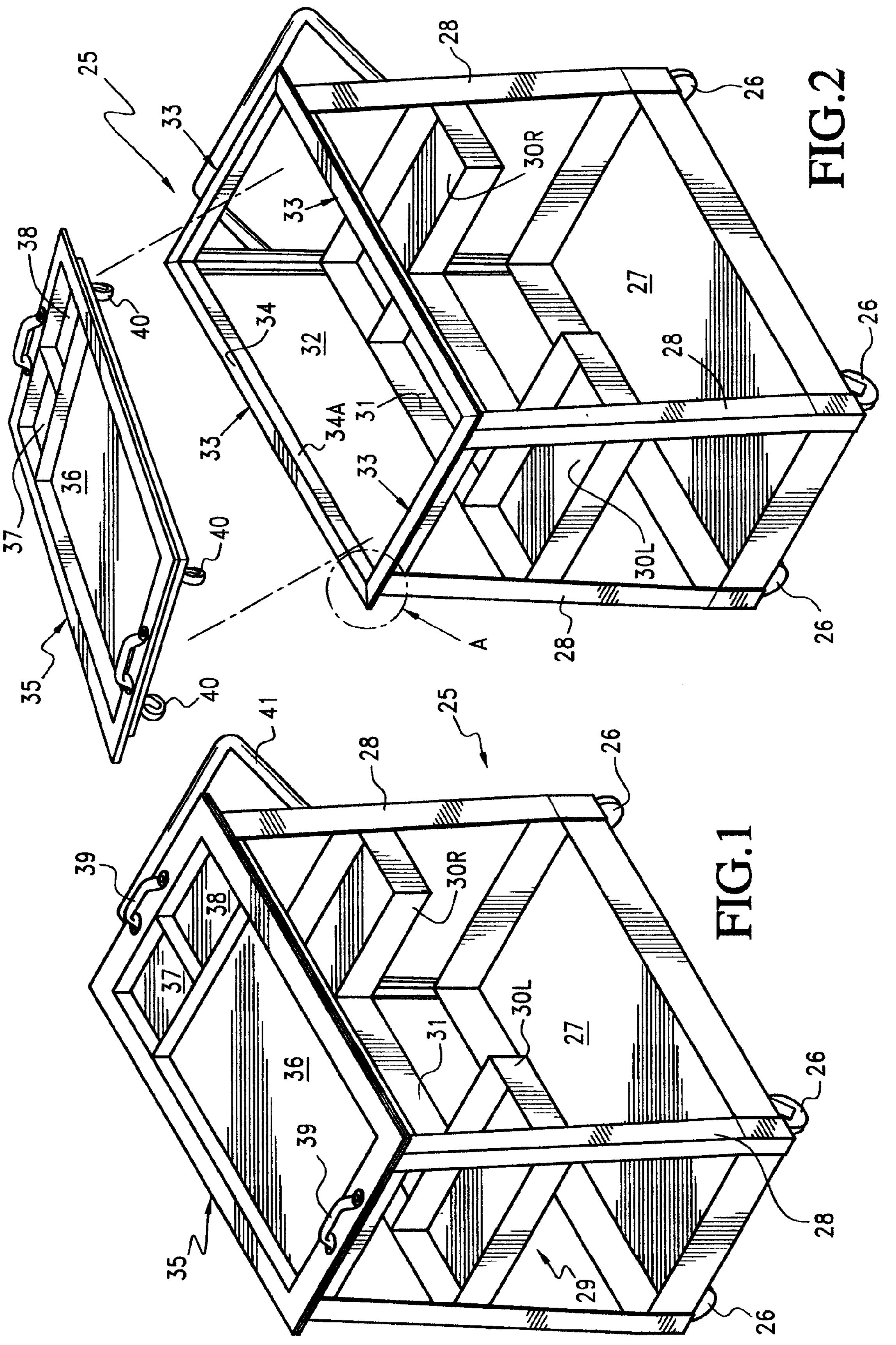
FIG. 1 is a perspective view of the novel tool and parts cart illustrating its multi-level construction.
FIG. 2 is another perspective view of the subject invention with the tool and parts tray removed from the cart well.

Referring now to FIG. 1, there is illustrated the novel tool and parts cart denoted by reference character 25. Cart 25 is mounted on a plurality of casters 26 positioned beneath lowermost tray 27. Lowermost tray 27 is an open tray with four sides to hold various larger parts that may be disassembled while performing a particular repair job. Casters 26 include two forward swivel casters and two rear fixed casters to provide mobility and directional control to the unit 25. Extending upwardly from the four corners of lowermost tray 27 are four supporting legs 28 that taper inwardly slightly to provide additional stability to the unit 25. Positioned slightly above the vertical midpoint of legs 28 is a second tray assembly 29 that is U-shaped and formed by two side compartments 30L and 31R with a rear interconnecting compartment 32, forming on open area between the two side compartments 31L and 31R and providing an opening of sufficient area to allow for placement of elongated parts such as a muffler, drive shaft or bumper to be vertically 0positioned therein while resting on the inside of lowermost tray 27. Positioned above second tray assembly 27 is removable tray 35 that is received in well 32. Removable tray 35 is subdivided into a first large compartment 36 and two smaller compartments 37, 38 located to one side of large compartment 36. All three compartments 36, 37 and 38 are of the same depth and can be conveniently used for storing and separating smaller parts and tools. Removable tray 35 is provided with a pair of oppositely disposed handles 39 for easy removal from well 32. Cart 25 is provided at its upper end with a handle 41 at one side thereof for moving the cart 25 from place to place.

Referring now to FIG. 2, there is shown another perspective view similar to FIG. 1, however, in this view, removable tray 35 has been removed from cart 25 and casters 40 are seen positioned underneath tray 35. Casters 40 are particularly useful when the mechanic is working underneath a raised vehicle lying on a creeper, tray 35 provides a convenient place to immediately place any vehicle parts, i.e. nuts, bolts, washers, under disassembly, thus eliminating the need to slide out from beneath the vehicle and find a secure area to place them. Also shown are four angle members 33 with an upper flat surface 34 and a depending leg portion 34A that form well 32 for snugly receiving removable tray 35 allowing tray lip 35A to rest thereon.

FIG. 3 is a plan view of the cart illustrating the placement of the various compartments in tray and their locations. As can be seen in this view there is plenty of room for placement of either tools or parts that have been removed from the vehicle. Compartments 37 and 38 can be used for storing and separating parts that come from opposite sides of a unit, thus reducing searching time in reassembly.

FIG. 4 is a sectional view taken along the plane 4—4 of FIG. 3, illustrating the shelving arrangement and the position of tray when placed within its well. As shown, tray 36 fits snugly in well 32 thus ensuring that there will not be any movement of tray 36 relative to the cart 25 during any movement of cart 25. Resting in lowermost tray 27 is a muffler M, shown in phantom and also supported by the intermediate shelf portion 31.

Referring now to FIG. 5, there is shown a detail view looking at the outside of the encircled corner A of the upper frame members 33 and their relation to supporting leg 28 to form well 32. The frame portion 33 has a flat upper surface 34 upon which the peripheral lip 35A of tray 35 conveniently rests and a depending inward facing surface 34A that provides lateral support to the tray when positioned therein.

By way of review, it is pointed out that applicant has provided a novel parts and tool cart that provides convenient storage for parts that are disassembled during a repair job. It in addition to their storage, the parts can be separated by size or the location from which they were removed, thus saving the mechanic additional time in reassembling.

While the invention has been described in its preferred embodiment, it is to understood that the words which have been used are words of description rather than words of limitation and that changes may be made within the purview of the appended claims without departing from the full scope or spirit of the invention.

Having thus described my invention, I claim:

1. A mechanic's combination utility cart for holding and storing specific tools and parts comprising:

frame means comprising four vertically extending members and a plurality of interconnecting members at the uppermost ends thereof forming a well therebetween;

a base portion serving as a first level storage area securely mounted within the confines of said vertically extending frame means and having a plurality of casters mounted beneath said base portion;

an intermediate level storage area vertically spaced from said first level storage area having a plurality of compartments arranged to form a generally U-shaped configuration;

said U-shape configuration of said intermediate level storage area allowing separation of tools utilized by the mechanic in making repairs and having a vertical storage area for elongated parts that are removed from a vehicle during a repair job;

a third level storage area vertically spaced from said second level storage area including removable tray means in said well;

said second and third level storage areas also mounted within the confines of said vertically extending frame means whereby said first, second and third level storage areas cooperate to provide a sturdy, readily movable utility cart that saves the user significant amounts of time by having the cart in an immediate vicinity during the repair job.

2. A mechanic's combination utility cart as defined in claim 1 wherein said interconnecting frame members of said frame means have an upper horizontal surface and a depending leg portion whereby said interconnecting frame members form said well for snugly receiving said removable tray means.

3. A mechanic's combination utility cart as defined in claim 2 where said removable tray means comprises a multi-compartment tray with two compartments in abutting relation and located to one side of said tray and a third compartment occupying the remaining surface area of said tray whereby one of said first two compartments can be utilized for storage of tools with said other smaller compartment used for smaller vehicle parts.

4. A mechanic's combination utility cart as defined in claim 3 wherein said removable tray means include casters positioned on the undersurface thereof and a plurality of handles oppositely disposed on the periphery of said tray to allow convenient carrying of said tray during use.

5. A mechanic's combination utility cart as defined in claim 4 wherein the overall size of said tray includes dimensions that are small enough to permit the user to take said tray into the interior of a vehicle when performing repairs.

6. A mechanic's combination utility cart as defined in claim 1 wherein said vertically extending frame members comprise two pair of frame members forming legs that taper inwardly a slight amount from said base portion to said third level storage area whereby said utility cart is wider at the base portion than the remainder of said utility cart thus providing greater stability to the cart.

7. A mechanic's combination utility cart as defined in claim 6 wherein said utility cart is made of metallic material and said frame members are attached to said base portion, said second and third level storage areas by welding.

8. A mechanic's combination utility cart as defined in claim 6 wherein said utility cart is made of high strength plastic and said frame members are attached to said base portion, said second and third level storage areas by ultra sonic welding.

9. A mechanic's combination utility cart as defined in claim 6 wherein said utility cart is made of metallic material and said frame members are joined to said base portion, said second and third level storage areas by fasteners.

10. A mechanic's combination utility cart as defined in claim 6 wherein a handle is attached to two of said vertically extending members for maneuvering said utility cart.

* * * * *